United States Patent
Wagner et al.

(10) Patent No.: US 8,915,530 B2
(45) Date of Patent: Dec. 23, 2014

(54) VEHICLE SUPPORT FRAMES WITH INTERLOCKING FEATURES FOR JOINING MEMBERS OF DISSIMILAR MATERIALS

(75) Inventors: David Anthony Wagner, Northville, MI (US); Michael M. Azzouz, Livonia, MI (US); Ari Garo Caliskan, Canton, MI (US); Yuksel Gur, Ann Arbor, MI (US); Sunil K. Kasaragod, Canton, MI (US); Xiaoming Chen, Canton, MI (US); John Edward Huber, Novi, MI (US); Parameswararao Pothuraju, Canton, MI (US); Jeffery Wallace, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 13/221,142

(22) Filed: Aug. 30, 2011

(65) Prior Publication Data

US 2013/0026796 A1    Jan. 31, 2013

Related U.S. Application Data

(60) Provisional application No. 61/512,559, filed on Jul. 28, 2011.

(51) Int. Cl.
    *B62D 27/00*    (2006.01)
    (Continued)

(52) U.S. Cl.
    CPC ............ *B62D 21/02* (2013.01); *B23B 37/1284* (2013.01); *B23K 2203/08* (2013.01); *B23K 2203/20* (2013.01); *B23K 2201/006* (2013.01); *B23K 2203/18* (2013.01); *B23K 33/006* (2013.01); *B23K 31/02* (2013.01); *B23K 26/28* (2013.01); *B23K 2201/28* (2013.01); *B23K 2201/185* (2013.01); *B23K 33/008* (2013.01)
    USPC ............................ 296/29; 296/205; 29/897.2

(58) Field of Classification Search
    USPC ...................... 296/203.01, 205, 29; 29/897.2
    See application file for complete search history.

(56) References Cited

U.S. PATENT DOCUMENTS 4,131,980 A    1/1979    Zinnbauer
4,471,519 A    9/1984    Capello et al.
(Continued)

FOREIGN PATENT DOCUMENTS

DE    19538803 A1    4/1996
DE    19603956 A1    8/1997
(Continued)

OTHER PUBLICATIONS

Hak-Sung Kim, Torque Transmission Characteristics of the Press Fit Joint Between the Aluminum Shaft and Steel Right with Small Teeth, Mechanics Based Design of Structures and Machines, Jan. 28, 2011, vol. 39, Issue 1, http://www.tandfonline.com/doi/abs/10.1080/15397734.2011.538655.

(Continued)

*Primary Examiner* — Jason S Morrow
*Assistant Examiner* — E Turner Hicks
(74) *Attorney, Agent, or Firm* — Brooks Kushman P.C.; Raymond L. Coppiellie

(57) ABSTRACT

The present disclosure relates to methods of manufacturing vehicle frame assemblies. Some of the disclosed methods include forming a key and receptor arrangement between an interconnecting member, having a first material composition, and a cross-member, having a second material composition; attaching the interconnecting member and cross-member via the key and receptor arrangement at one location; inserting the interconnecting member and cross-member in a side rail; and welding the interconnecting member to the side rail at another location.

10 Claims, 5 Drawing Sheets

(51) Int. Cl.
*B23K 33/00* (2006.01)
*B23K 31/02* (2006.01)
*B23K 26/28* (2014.01)
*B62D 21/02* (2006.01)

(56) References Cited

U.S. PATENT DOCUMENTS

| | | |
|---|---|---|
| 5,427,198 A | 6/1995 | Walsh |
| 5,470,416 A | 11/1995 | Herring, Jr. et al. |
| 5,865,362 A | 2/1999 | Behrmann et al. |
| 5,966,813 A * | 10/1999 | Durand ............... 29/897.2 |
| 6,000,118 A | 12/1999 | Biernat et al. |
| 6,299,210 B1 | 10/2001 | Ruehl et al. |
| 6,696,147 B1 | 2/2004 | Herring, Jr. et al. |
| 6,701,598 B2 * | 3/2004 | Chen et al. ............ 29/421.1 |
| 6,922,882 B2 * | 8/2005 | Shah et al. ............ 29/421.1 |
| 7,127,816 B2 | 10/2006 | Kiehl |
| 7,144,040 B2 | 12/2006 | Kiehl et al. |
| 7,267,736 B2 | 9/2007 | Hou et al. |
| 7,517,425 B2 | 4/2009 | Schroeder et al. |
| 7,654,571 B2 | 2/2010 | Gabbianelli et al. |
| 8,146,930 B2 | 4/2012 | Sicilia et al. |
| 8,528,803 B2 | 9/2013 | Ohashi et al. |
| 2002/0170766 A1 | 11/2002 | Gantz et al. |
| 2005/0133483 A1 | 6/2005 | Hou et al. |
| 2006/0032895 A1 | 2/2006 | Durand et al. |
| 2008/0296433 A1 | 12/2008 | Brenner et al. |
| 2009/0188206 A1 * | 7/2009 | Stol et al. ............... 52/762 |
| 2010/0289300 A1 * | 11/2010 | Kokubo ................ 296/205 |
| 2011/0018248 A1 | 1/2011 | Cordea |
| 2012/0068499 A1 | 3/2012 | Mildner et al. |
| 2013/0026794 A1 | 1/2013 | Wagner et al. |
| 2013/0229005 A1 | 9/2013 | Knittel et al. |

FOREIGN PATENT DOCUMENTS

| | | |
|---|---|---|
| DE | 10311946 A1 | 10/2003 |
| DE | 60111777 T2 | 2/2006 |
| DE | 102004044017 A1 | 3/2006 |
| DE | 10329017 B4 | 12/2008 |
| DE | 102010045586 A1 | 3/2012 |
| EP | 1506908 A3 | 8/2004 |
| EP | 1854704 A1 | 5/2007 |
| JP | 2007222877 A * | 9/2007 |
| WO | WO9639322 A1 | 6/1996 |
| WO | 9839174 A1 | 11/1998 |
| WO | 0247959 A1 | 6/2002 |
| WO | WO2009094090 | 7/2009 |

OTHER PUBLICATIONS

German Search Report for corresponding application, 102012214558.3, dated Feb. 12, 2013, 6 pages.

* cited by examiner

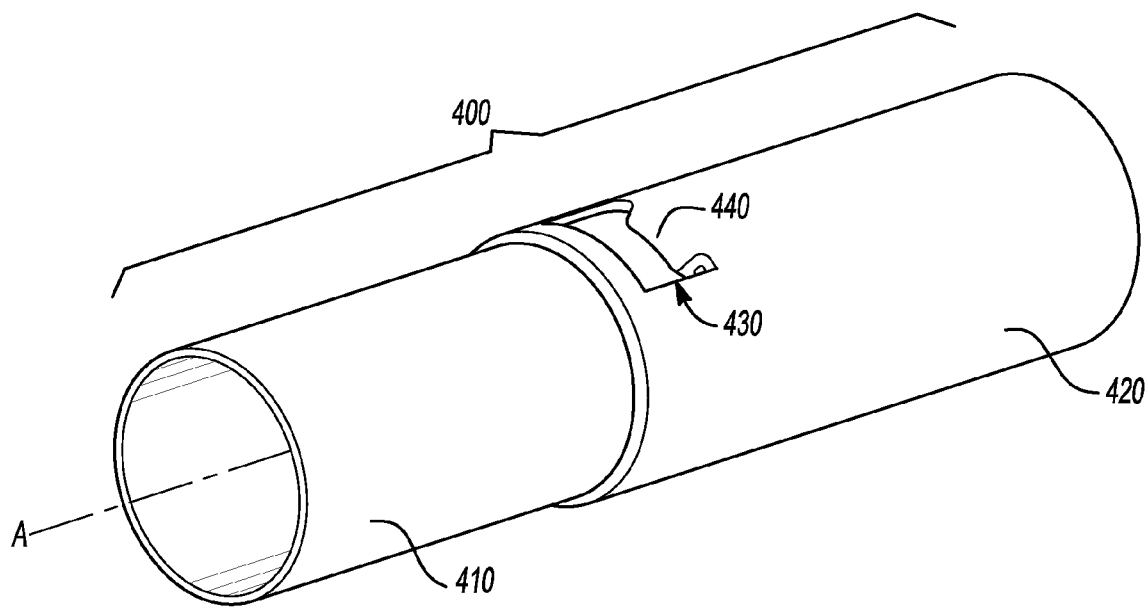
Fig-9
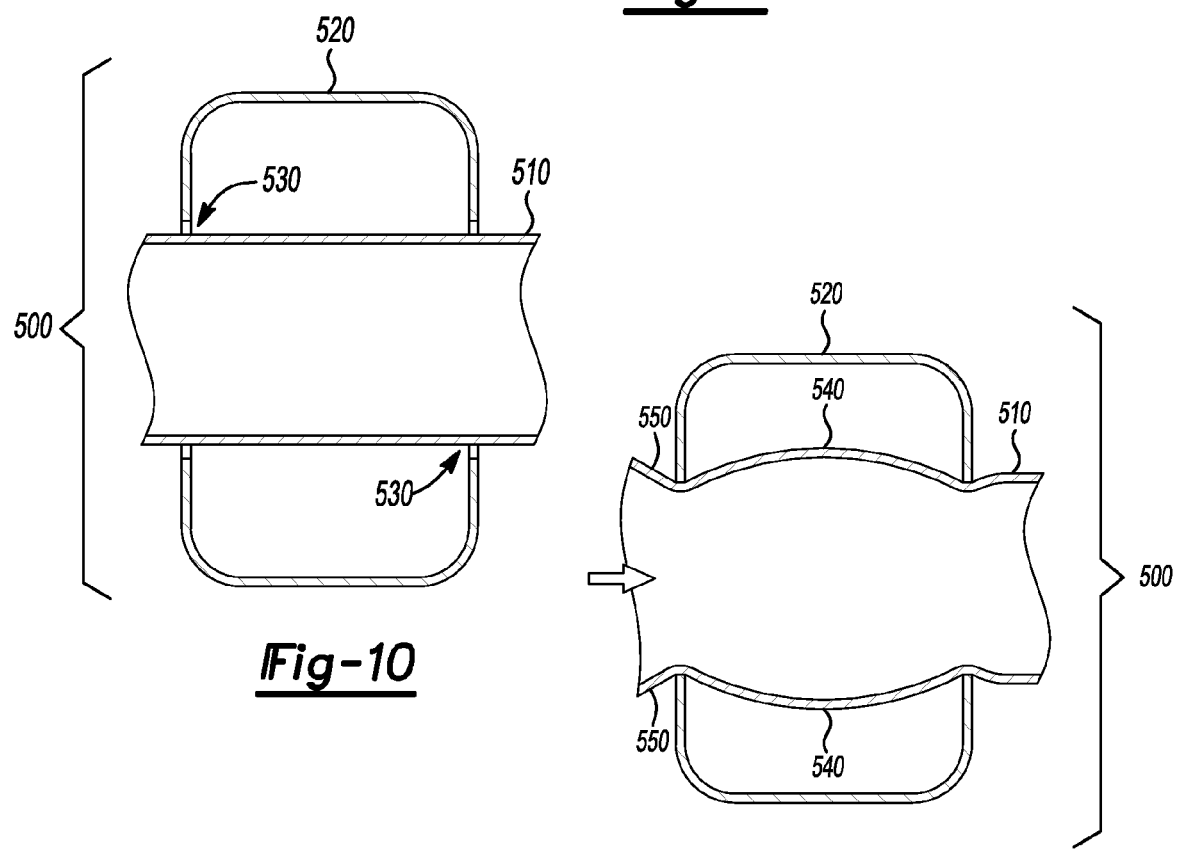
Fig-10
Fig-11

VEHICLE SUPPORT FRAMES WITH INTERLOCKING FEATURES FOR JOINING MEMBERS OF DISSIMILAR MATERIALS

CROSS-REFERENCE TO RELATED APPLICATIONS

This application is claims the benefit of U.S. Patent Provisional Ser. No. 61/512,559 titled "Vehicle Support Frames with Interlocking Features for Joining Members of Dissimilar Materials" filed Jul. 28, 2011, which is hereby incorporated by reference in its entirety.

TECHNICAL FIELD

The present disclosure relates to vehicle support frames with members having dissimilar materials and methods for manufacturing the same.

BACKGROUND

Conventional vehicle support frames can be composed of different materials including, for example, steel, aluminum and reinforced polymer composites. Vehicle manufactures attempt to strike the balance between weight reduction and structural rigidity. It is desirable to design lightweight cross-members for full-sized light truck frames. Aluminum cross-members can be designed to achieve up to 50% weight reduction while still meeting performance targets. Though aluminum cross-members have high potential for building lightweight truck frames aluminum has a lower material strength than steel. Joining aluminum members to steel frame rails also present challenges especially when both parts are closed-section tubular components. Additionally, it can be costly to retool existing manufacturing facilities handle complex techniques of joining dissimilar materials.

Some existing references within the art teach the use of mechanical fasteners to secure two rails made of dissimilar materials together. These techniques, however, are less desirable. These mechanical features include fasteners, which can increase costs and manufacturing complexity. One patent reference teaches the use of an overlapping configuration for the rails of dissimilar materials. A structural member sandwiches one end of a first structural member and is welded onto a second structural member. US Patent Publication No. 20090188206, titled "System and Method for Joining Dissimilar Materials." The overlapping configuration taught therein forms for a 3-way mechanical interlock and is more suitable for collinear structural member connection as opposed to intersecting or angled structural member connection, i.e., side rail to cross-member connections. Closed-section structural members also appear to be incompatible with these teachings.

Therefore, it is desirable to have improved interconnecting techniques for joining two structural members composed of dissimilar materials to produce a vehicle frame assembly.

SUMMARY

The present disclosure addresses one or more of the above-mentioned issues. Other features and/or advantages may become apparent from the description which follows.

According to one exemplary embodiment, a method of manufacturing a vehicle frame assembly includes: forming a key and receptor arrangement between an interconnecting member, having a first material composition, and a cross-member, having a second material composition; attaching the interconnecting member and cross-member via the key and receptor arrangement at one location; inserting the interconnecting member and cross-member in a side rail; and welding the interconnecting member to the side rail at another location. The forming a key and receptor arrangement includes: forming the key as a lip in the interconnecting member; forming the receptor as an orifice in the cross-member; and folding the lip around an edge of the orifice thereby forming a hem-lock.

According to another exemplary embodiment, a method of manufacturing a vehicle cross-member assembly includes: forming an orifice in one of a first structural member or a second structural member of dissimilar material composition; intersecting the first structural member and second structural member; forming the other of the first structural member or second structural member into the orifice thereby creating a mechanical interlock between the first structural member and second structural member; and forming a hemlock between the first structural member and second structural member, thereby creating another mechanical interlock.

According to another exemplary embodiment, a vehicle frame assembly includes: a first structural member having an interconnecting member; a second structural member, intersecting the first structural member at the interconnecting member; and a mating key and receptor alternately formed on the second structural member or interconnecting member to create a mechanical interlock when mated. The key is a lip formed in the interconnecting member. The receptor includes an orifice formed in the second structural member. The lip is configured to fold around an edge of the orifice thereby forming a hem-lock.

One advantage of the present teachings is that they disclose light weight vehicle structural frames that can be utilized with vehicles of different sizes, including full-sized truck frames. The weight reduction associated with the present disclosure can be as great as 50%.

Another advantage of the present teachings is that they enable the joining of structural members of two dissimilar materials that can have a closed-section. Structural members can be positioned at any angle with respect to each other.

Joining a longitudinal rail and lateral rail composed of dissimilar materials will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

BRIEF DESCRIPTION OF THE DRAWINGS

FIG. 9 is a perspective view of the sleeve and cross-member of FIG. 8.

FIG. 10 is a cross-sectional view of another exemplary embodiment of a cross-member and rail assembled.

FIG. 11 is the cross-member and rail of FIG. 10 attached via another exemplary joining technique.

DETAILED DESCRIPTION

Figure 1:
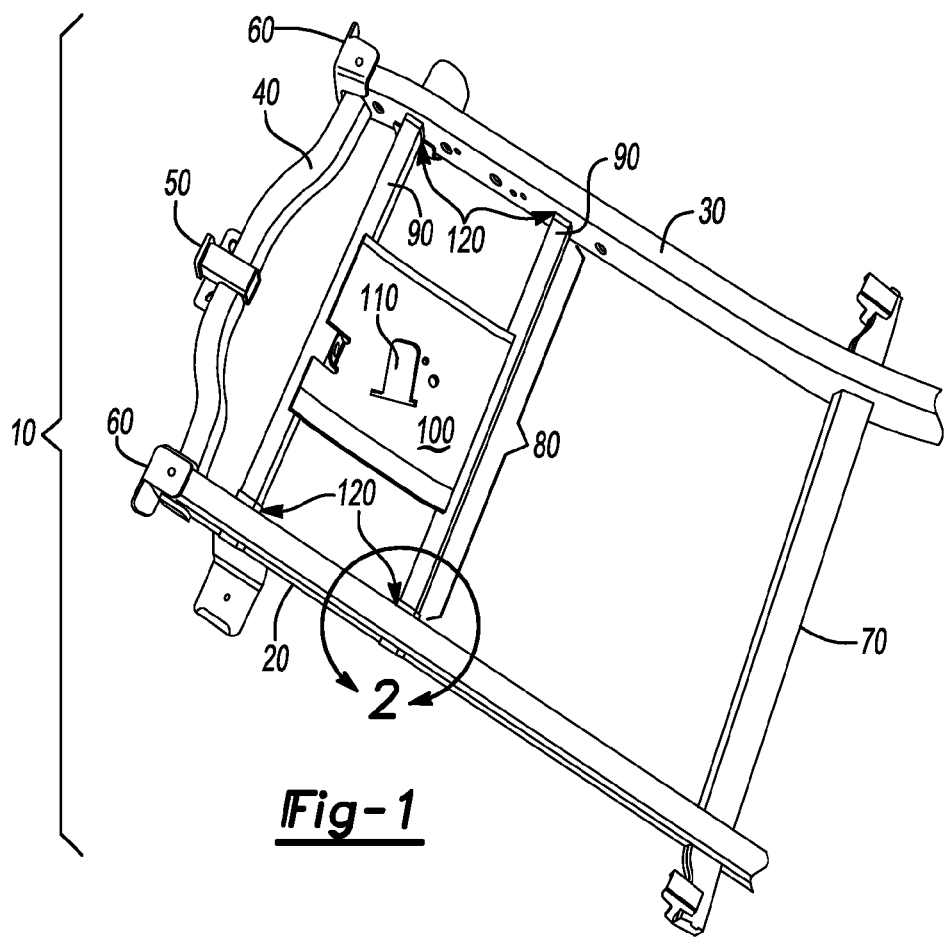
FIG. 1 is a top perspective view of a vehicle support frame assembly according to an exemplary embodiment of the present invention.

Referring to the drawings, wherein like characters represent examples of the same or corresponding parts throughout the several views, there are shown vehicle support frames having joined structural members composed of different materials. Particularly, lighter weight aluminum cross-members are joined to steel side rails through an interconnecting member juxtaposed therebetween. The illustrated interconnecting member, between the cross-member and the side rail, mitigates the challenges of joining dissimilar materials by teaching mechanical interlocking techniques between the interconnecting member and cross-member at one location and other attachment techniques between the side rail and interconnecting member at another location. One end of the interconnecting member is joined to the aluminum cross-member using mechanical interlocking features. The attachment techniques used to attach the side rail to the assembly at another end of the interconnecting member including, e.g., MIG welding, brazing, or soldering. The disclosed interconnecting members facilitate the use of lower weight materials in the vehicle frame.

Also disclosed are methods of manufacturing vehicle frame assemblies that include joining techniques which do and do not require the use of an interconnecting member to join the side rail with cross-members.

The disclosure describes the designs and processes to connect, for example, an aluminum cross-member to a steel interconnecting member or sleeve. The sub-assembly of the aluminum cross-member and the steel sleeve can then be attached to steel side rails with conventional manufacturing processes such as welding.

Referring now to FIG. 1, there is shown therein a vehicle support frame 10. The support frame 10 is configured for use in a full-sized pickup truck. Any vehicle support frame, however, is compatible with the present teachings including, for example, coupes, sedans, SUVs, all utility vehicles, vans and commercial vehicles. Support frame 10 (as shown) is taken from the rear section of the truck frame. This section supports the truck bed (not shown). Side rails (or structural members) 20 and 30 extend longitudinally with respect to the assembly and the vehicle. In the shown embodiment, side rails 20, 30 can be composed of steel and formed via an extrusion, hydroform, roll forming or other processes. The rearward ends of the side rails are interconnected through a steel cross-member 40. Attached to cross-member is a tow hitch 50. Each end of the rails 20, 30 are fitted with a side bracket 60 for interconnecting cross-member 40 with rails and for connecting rails 20, 30 to other vehicle structure (not shown).

At the frontward end of the support frame 10, as shown in FIG. 1, there is another steel cross-member 70 intersecting each side rail 20, 30. As shown, side rail 30 is welded to cross-member 70. Each side rail 20, 30 includes a ladder bracket (not shown) for attachment points and wire harnesses.

The vehicle support frame 10, as shown in FIG. 1, also includes a subassembly 80 for mounting spare tires. Subassembly 80 includes two laterally extending aluminum cross-members 90. Cross-members 90 support a subframe 100 for the spare tire. A winch (not shown) secures the tire to the subframe through orifice 110. Subframe 100 can be composed of aluminum, an aluminum alloy, steel, titanium or a polymer. The illustrated subframe 100 is stamped. The subframe 100 can also be formed, for example, via die casting using powder metallurgy techniques.

Aluminum cross-members 90 are configured to secure the subframe 100 with respect to the side rails 30. Cross-members 90 extend laterally with respect to the frame assembly and vehicle. Cross-members 90 are fitted with an interconnecting member 120, as discussed hereinbelow. Interconnecting members 120 are attached to the cross-members through the use of a mechanical interlocking feature at one end; interconnecting members are further attached to the side rails 20 and 30 via MIG welding at the opposite end. In this embodiment, interconnecting member 120 is a steel sleeve configured to completely encircle a section of the cross-member 90.

Figure 2:
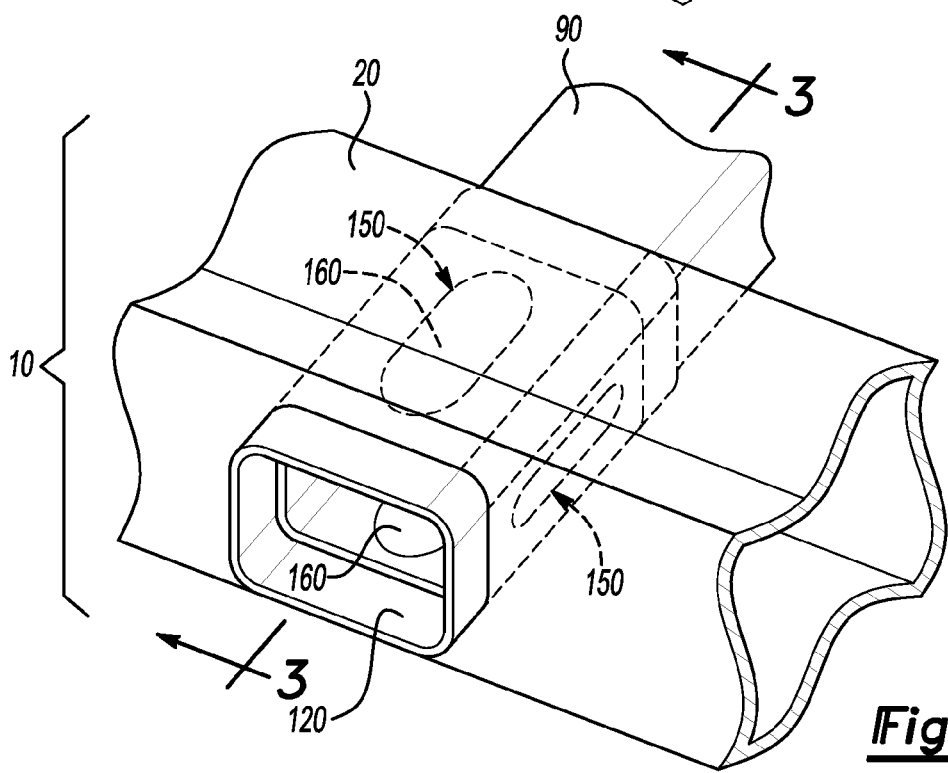
FIG. 2 is a perspective view of the sleeve and cross-member of FIG. 1 at circle 2.
Figure 3:
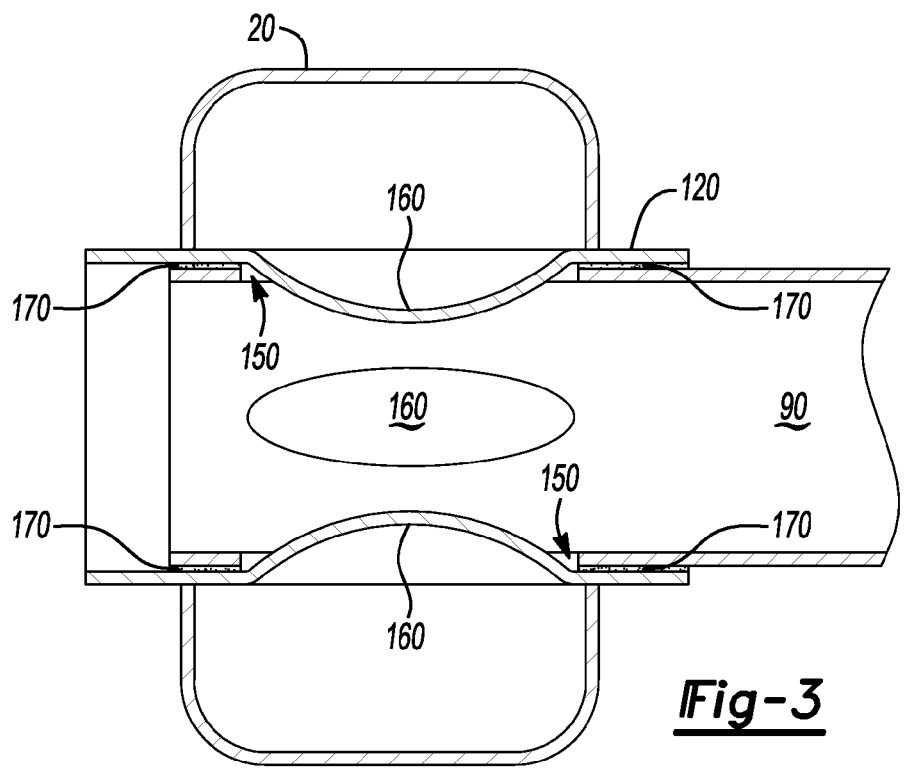
FIG. 3 is a cross-sectional view of the sleeve and cross-member of FIG. 2.

Now with reference to FIGS. 2-3, there is shown therein a perspective view of a section of the vehicle frame assembly 10 of FIG. 1 at circle 2. Side rail 20 is fitted with steel sleeve 120 and aluminum cross-member 90 inserted therein. Oblong orifices 150 are cut on each of the four surfaces of the interconnecting member 120 at a location near the end of the cross-member 90. The aluminum cross-member 90 is placed inside the steel side rail 20. The sleeve 120 is configured with a series of keys 160 that extend into the receptors or orifices 150 formed in the cross-member 90. In this illustrated embodiment, keys 160 are protrusions (or impressions) that act as a mechanical interlock between the sleeve 120 and cross-member 90. The sleeve 120 and cross-member 90 are thereby attached at the mechanical interlock (or key and receptor arrangement). Receptors 150 are oblong orifices formed at one end of the cross-member 90. The sleeve-cross-member interlock can also be reinforced by the use of an adhesive 170 applied to the overlapping sections of sleeve 120 and cross-member 90, e.g., as shown. Adhesive can be activated via a brazing process, thermal activation, humidity or other processes.

After sleeve 120 and cross-member 90 are joined, the two are inserted in the steel rail 20. The sleeve 120 is then attached to the side rail 20. In this embodiment, sleeve 120 is attached to side rail 20 via a welding process. The commonality of the material selections between the sleeve 120 and side rail 20 ease the welding process. With respect to the illustrated embodiment of FIG. 2-3, the joint between sleeve 120 and cross-member 90 occurs within the side rail 20 (as shown). In other embodiments, the joint between sleeve and cross-member occurs outside of the side rail.

Figure 4:
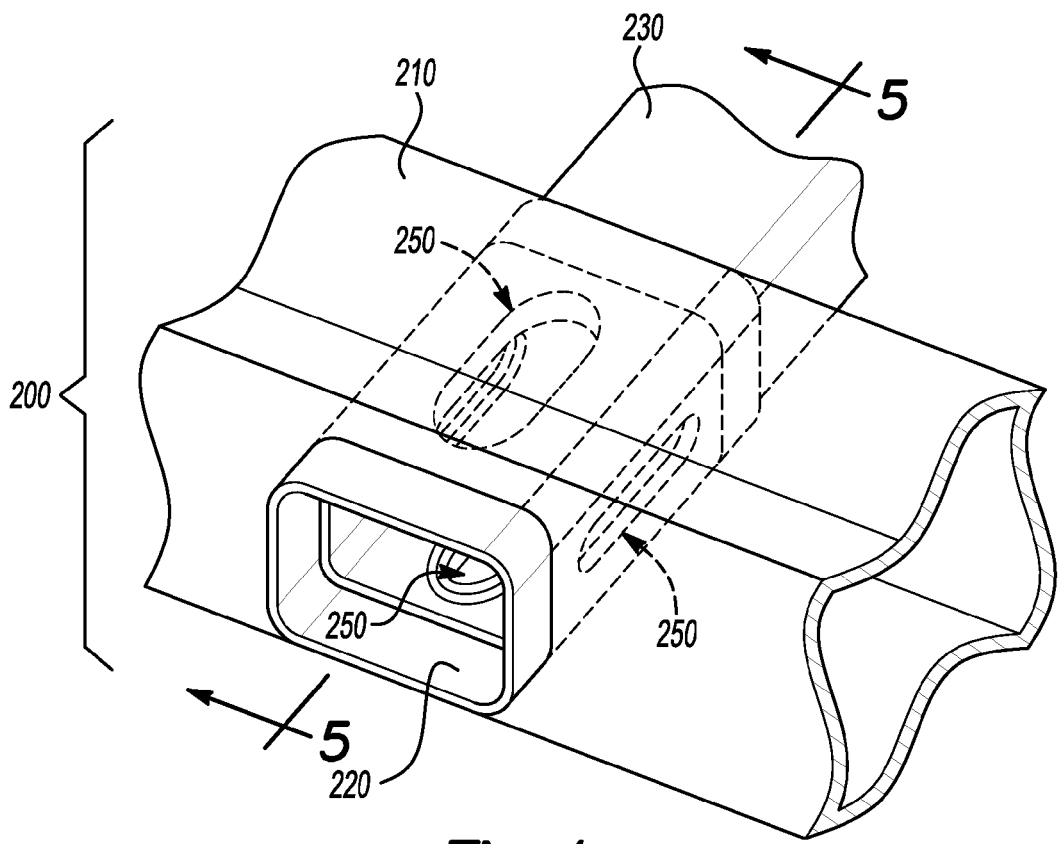
FIG. 4 is a perspective view of another exemplary embodiment sleeve and cross-member.
Figure 5:
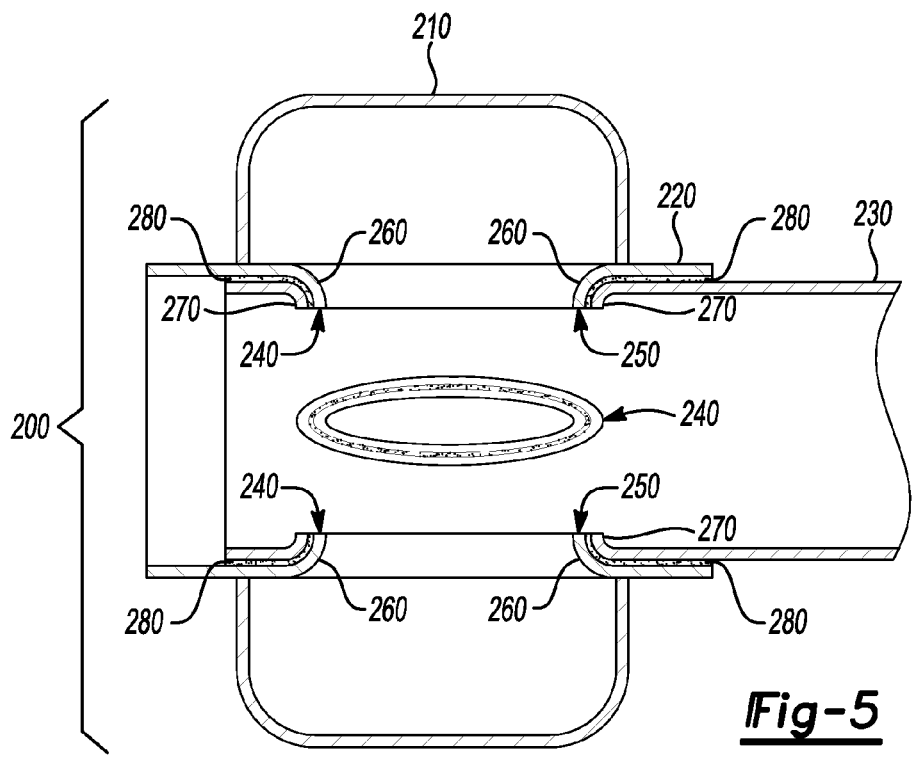
FIG. 5 is a cross-sectional view of the sleeve and cross-member of FIG. 4.

Another exemplary embodiment of a vehicle support frame 200 is shown with respect to FIGS. 4 and 5. A side rail 210 is fitted or intersected with a steel interconnecting member 220 (or sleeve) and an aluminum cross-member 230. Orifices 240, 250 are cut on the four surfaces of both the cross-member 230 and sleeve 220, respectively. The orifices 240, 250 are oblong in shape and positioned on mating surfaces of the aluminum cross-member 230 and steel sleeve 220. Orifice 240 has a slightly larger major and minor diameter than that of orifice 250. The sleeve 220 is configured with a lip 260 that extends into the orifice 240 formed in cross-member 230 at edge (or lip) 270, as shown in the cross-section of FIG. 5. Lip 260 acts as a mechanical interlock between the sleeve 220 and cross-member 230. The sleeve 220 and cross-member 230 are mechanically attached at the mating juncture of lip 260 and the lip 270 of orifice in the cross-member 230. In the shown embodiment, the sleeve 220 is secured onto the cross-member by the use of an adhesive 280 applied to the sections of the sleeve that overlap the cross-member. Adhesive 280 is activated via a brazing process. In other embodiments, adhesive can be activated thermally, by humidity or by other processes. In other embodiments, no adhesive is used.

Figure 6:
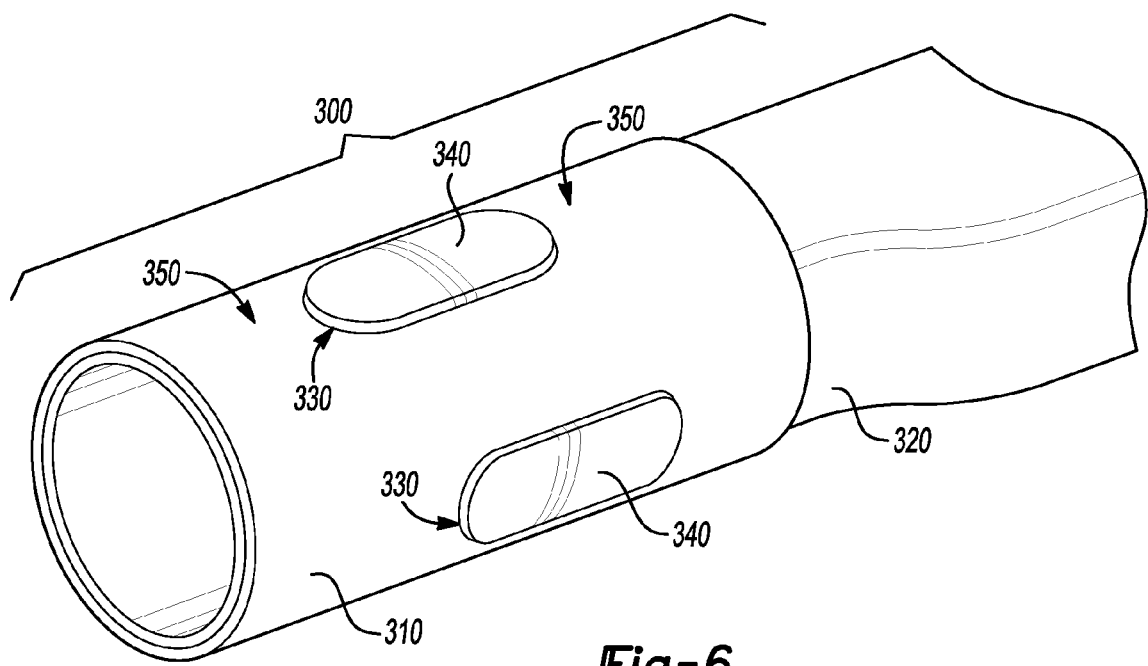
FIG. 6 is a perspective view of another exemplary embodiment of a sleeve and cross-member.
Figure 7:
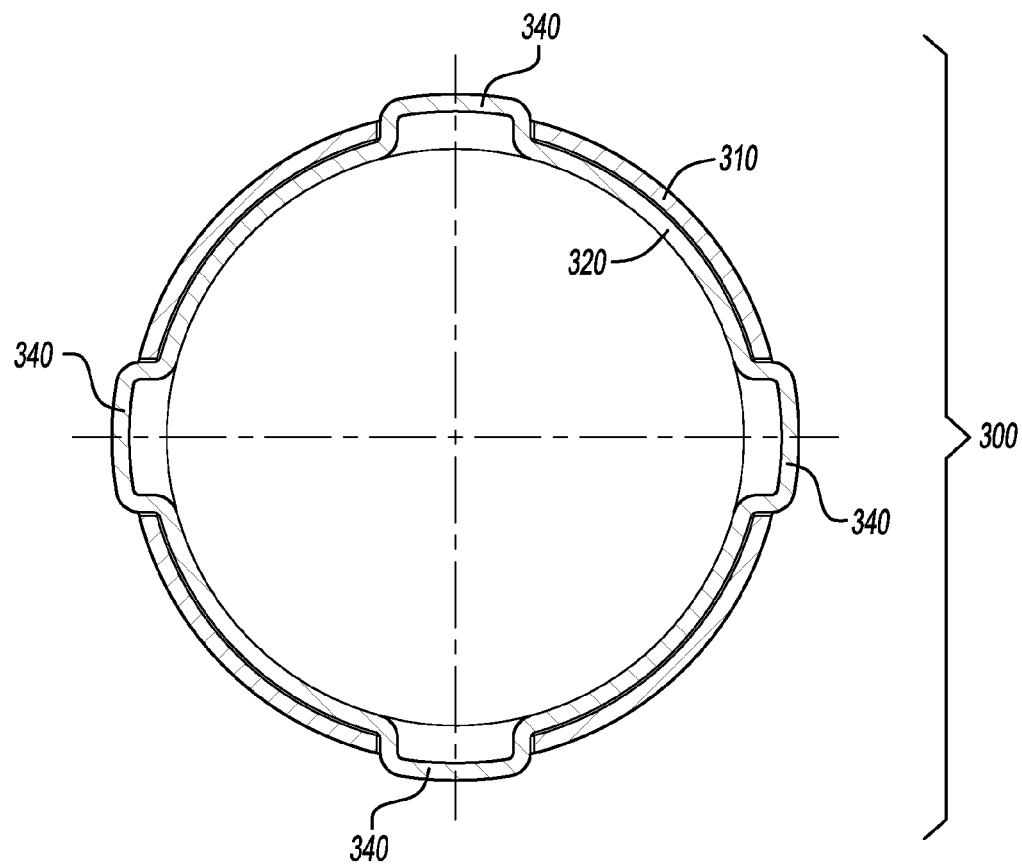
FIG. 7 is a cross-sectional view of the sleeve and cross-member of FIG. 6.

Now with reference to FIGS. 6 and 7 there is illustrated therein another exemplary embodiment of a vehicle support frame assembly 300. Shown in FIG. 6, is a sleeve 310 and cross-member 320 fitted with the sleeve on the outside of the cross-member. Sleeve 310 acts as an interconnecting member between the cross-member 320 and a side rail (e.g., 20 as shown in FIG. 1). Sleeve 310 has a series of oblong shaped orifices 330, as shown in FIG. 6. An end of the aluminum cross-member 320 is fitted onto the sleeve 310 and formed so that the cross-member and sleeve are press-fit together. In the illustrated embodiment, cross-member 320 is pressurized to deform into sleeve 310. Depending on the thickness and material selection of the cross-member the pressurization can vary. In one embodiment, the cross-member 320 is made of aluminum and formed by increasing the pressure therein to 3000 psi. This process is commonly referred to as a hydro-forming process. When the aluminum cross-member 320 is pressurized protrusions 340, impressions, or buttons are created that extend into the orifices 330 in sleeve 310, as shown in FIG. 7. Thus, another type of mechanical interlock is accomplished. Sleeve 310 and cross-member 320 are mechanically connected at mating interface between the protrusions 340 and orifices 330. The sleeve 310 and cross-member 320 are then inserted into a steel side rail and the sleeve is welded thereto at different location than the mating interface between the sleeve and cross-member, e.g. 350. If, for example, structural performance demands such, adhesive can be included into the overlapping area of the joint.

Figure 8:
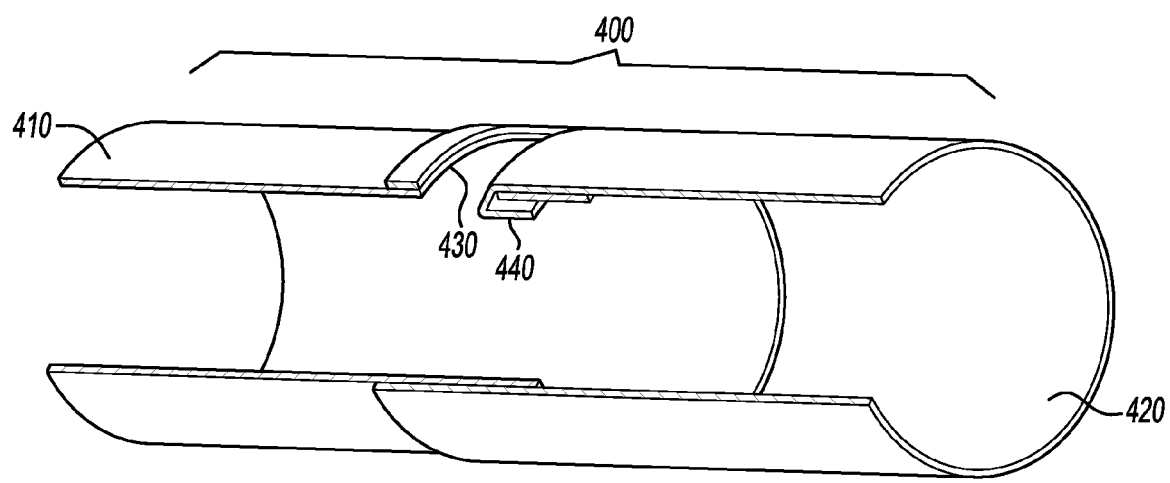
FIG. 8 is a partial perspective view of another exemplary embodiment of a sleeve and cross-member.

Now with reference to FIGS. 8 and 9, there is illustrated therein another alternative embodiment of a vehicle frame assembly 400. A light-weight cross-member 410 is fitted with a steel sleeve 420. An orifice 430 is cut along the perimeter of the cross-member 410. Sleeve 420 is configured with a lip 440 that extends into the orifice 430 formed in the cross-member 410. In this arrangement, the lip 440 in sleeve 420 acts as a key for the receptor (or orifice 430) in the cross-member 410. Lip 440 is formed on the steel sleeve 420 at a location to coincide with the orifice 430 on the aluminum cross-member 410. After the aluminum cross-member 410 is placed inside the steel sleeve 420, lip 440 is pushed down through the orifice 430 and folded over so that the edge of lip is parallel to a longitudinal axis, A, of the cross-member 410 and sleeve 420 assembly. When folded over the edge of orifice 430 lip 440 forms a hem-lock between the cross-member 410 and sleeve 420. Cross-member 410 and sleeve 420 are attached at the edge of the orifice 430. Sleeve 420 can then be attached to a side rail (e.g., 20 as shown in FIG. 1) via a welding process.

FIGS. 10-11 illustrate another exemplary embodiment of a vehicle frame assembly 500. In this embodiment, no interconnecting member between a cross-member 510 and side rail 520 is needed. The aluminum cross-member 510 is attached to the steel side 520 rail via hydro-forming. The aluminum cross-member 510 is placed inside the rail 520 prior to MIG welding. An initial gap exists between the cross-member 510 and steel rail 520. Rail 520 includes an orifice 530 (as shown in cross-section) through which the aluminum tube (or cross-member) 510 is fitted. The aluminum cross-member 510 is pressurized to approximately 3500 psi so as to create protrusions 540 (or bubbles) that deform into the orifices 530 in sleeve 510. Flanges 550 are formed on the cross-member 510. Hydro-forming of the aluminum cross-member 510 increases the cross-section so as to create a mechanical joint at the rail 520. Thus, another type of mechanical interlock is accomplished. In one embodiment, an adhesive (e.g., 170 as shown in FIG. 3) is applied to the cross-member 510 before insertion into the side rail 520. Adhesive can have anti-corrosion benefits as well locking. In one embodiment, side rail 520 is formed with a serrated edge at the perimeter of orifice 530 to act as a secondary mechanical lock between the side rail and cross-member 510. In another embodiment, cross-member is pre-stressed before insertion into the side rail. Pre-stressing is performed to control the way in which the cross-member 510 deforms during hydro-forming. For example, a preliminary rectangular indentation can be formed on a cross-section of the cross-member before stressing. The protrusion 540 on the cross-member 510 has squared-off edges in this embodiment.

In yet another embodiment, the cross-member 510 includes an orifice in which the side rail 520 can intrude. Cross-member is de-pressurized after insertion into the side rail. An exemplary vacuum is a pressure of −4500 psi. The side rail deforms into an orifice in the cross-member creating another mechanical interlock.

Hydro-forming is one of several methods that can be used to join an aluminum cross-member and steel side rail together without the use of an interconnecting member. In another embodiment, not shown, an interlock is created by inserting a cold aluminum circular cross-member into a heated steel circular tube. When the assembly is cooled, the tube and cross-member are interlocked through material shrinkage or shrink-fitting. A mandrel (or other forming device) can be used to shape the interlock between the side rail and cross-member.

Also disclosed herein are various methods of manufacturing a vehicle frame assembly. One exemplary method includes the following steps: forming a key and receptor arrangement between a sleeve (having a first material composition) and a cross-member (having a second material composition). Next the method involves attaching the sleeve and cross-member via the key and receptor arrangement at one location and inserting the sleeve and cross-member in a side rail. The interconnecting member is then attached to the side rail in a subsequent procedure, e.g., welding the sleeve to the side rail at another location.

In one embodiment of the aforementioned method, forming a key and receptor arrangement includes: (i) forming the key as a protrusion in the interconnecting member; and (ii) forming the receptor as an orifice in the cross-member. This is shown, for example, with respect to FIGS. 2 and 3. The key is the protrusion 160 formed in the sleeve 120 and the receptor is an orifice 150 formed in the cross-member 90.

In another exemplary embodiment of the aforementioned method, forming a key and receptor arrangement includes: (i) forming the key as a lip in the interconnecting member; and (ii) forming the receptor as an orifice in the cross-member. This is shown, for example, with respect to FIGS. 4 and 5.

In another exemplary embodiment of the aforementioned method, an additional step is included—folding the lip around an edge of orifice thereby forming a hem-lock. This is shown and discussed, for example, with respect to FIGS. 8 and 9.

In another exemplary embodiment of the aforementioned method, forming a key and receptor arrangement includes: (i) forming the key as a protrusion in the cross-member; and (ii) forming the receptor as an orifice in the interconnecting member. This is shown, for example, in FIG. 6 as discussed hereinabove.

Also disclosed is another exemplary method of manufacturing a vehicle frame assembly. The method includes: (i) forming an orifice in one of a first structural member or a second structural member having a dissimilar material composition to the material composition of the first structural member; (ii) intersecting the first structural member and second structural member; and (iii) forming the other of the first structural member or second structural member into the orifice thereby creating a mechanical interlock between the first structural member and second structural member, for example as discussed with respect to FIGS. 10 and 11. As discussed with respect to the embodiment of FIGS. 10 and 11, either the first structural member or second structural member is pressurized after intersection thereby causing the pressurized structural member to deform into the orifice. In some embodiments an adhesive or anti-corrosion material is applied before or after the mechanical interlock is formed.

It will be appreciated that the members (e.g., the sleeves, side rails and cross-members) shown can be composed of various materials including, for example, steel, aluminum, magnesium, titanium, tungsten and reinforced polymer composites. Attachment techniques for the sleeve to the side rail is not limited to MIG welding but can include laser welding, spot welding, brazing, the use of a fastener, soldering, clinging or crimping. Sleeves and rails can be formed using manufacturing techniques including, molding, casting, lathing, hydro-forming, stamping or an extrusion processes.

It should be appreciated that interconnecting members can be of any size, shape or configuration and are not limited to sleeves. For example, in other embodiments, interconnecting members are rectangular in shape and clamped on to a receptor in the cross-member to provide a surface for subsequent welding.

Adhesives can also be applied between any of the interconnecting members and cross-member or the interconnecting member and the side rails. Any type of adhesive can be used, e.g., a one- or two-part epoxy is compatible with the illustrated designs. The ends of the interconnecting member and cross-member can also have a braze material therebetween to enhance their connection and serve as corrosion mitigation. The ends of the mixed material overlapping joint can have a polymer or other sealing material.

Those familiar with the art to which this invention relates will recognize various alternative designs and embodiments for practicing the invention within the scope of the appended claims.

We claim:

1. A method of manufacturing a vehicle frame assembly, comprising:
    selecting a cross member, a sleeve member, and a rail, the cross member and sleeve member having different material compositions and the sleeve member and rail having the same material composition, a width of the sleeve member being greater than a width of the cross member;
    forming an aperture in a sidewall proximate an end of the cross member, wherein forming an aperture in the sidewall comprises forming a first lip extending inward about a circumference of the aperture;
    inserting the end of the cross member into the sleeve member to overlap the aperture with the sleeve member;
    deforming a portion of the sleeve to mechanically engage the aperture to form an interlocked cross member and sleeve member, wherein deforming a portion of the sleeve inward comprises forming a second lip extending from the inner face of the sleeve member and folded against the first lip;
    inserting the interlocked cross member and sleeve member into a sidewall of the rail, the sidewall of the rail defining a hole, wherein the cross member extends from the sidewall of the rail; and
    welding the sleeve member to the rail.

2. The method of claim 1, further comprising applying an adhesive to an overlapped region of the sleeve member and cross member.

3. The method of claim 1, wherein the aperture is oblong in shape.

4. The method of claim 3, wherein the aperture and deformed portion are oblong having a long axis oriented along a length of the cross member.

5. The method of claim 1, wherein the rail and sleeve member are made of steel and the cross member is made of aluminum.

6. A vehicle frame comprising:
    a rail having a long axis;
    a cross member having an aperture with a first inwardly-extending lip at a first end; and
    a sleeve member fitted about the cross member, the sleeve member having a second lip extending into the aperture folded against the first lip, the sleeve member being welded to the rail such that a long axis of the cross member intersects the long axis of the rail.

7. The vehicle frame of claim 6, further comprising an adhesive applied between the sleeve member and cross member.

8. The vehicle frame of claim 6, wherein the aperture and second lip are oblong having a long axis oriented along a length of the cross member.

9. The vehicle frame of claim 6, wherein the rail has a hole in a sidewall and the sleeve member is welded into the hole such that the second lip and aperture are retained within the rail.

10. The vehicle frame of claim 6, wherein the rail and sleeve member are made of steel and the cross member is made of aluminum.

* * * * *